(12) United States Patent
Francis, Jr. et al.

(10) Patent No.: US 8,996,429 B1
(45) Date of Patent: Mar. 31, 2015

(54) METHODS AND SYSTEMS FOR ROBOT PERSONALITY DEVELOPMENT

(75) Inventors: Anthony G. Francis, Jr., San Jose, CA (US); Thor Lewis, San Francisco, CA (US)

(73) Assignee: Google Inc., Mountain View, CA (US)

( * ) Notice: Subject to any disclaimer, the term of this patent is extended or adjusted under 35 U.S.C. 154(b) by 227 days.

(21) Appl. No.: 13/460,131

(22) Filed: Apr. 30, 2012

Related U.S. Application Data

(60) Provisional application No. 61/596,026, filed on Feb. 7, 2012, provisional application No. 61/483,295, filed on May 6, 2011.

(51) Int. Cl.
*G06F 17/30* (2006.01)

(52) U.S. Cl.
CPC .................................. *G06F 17/303* (2013.01)
USPC .............................................. 706/12; 706/45

(58) Field of Classification Search
CPC ....................................................... G06N 3/006
USPC .................................................... 706/12, 45
See application file for complete search history.

(56) References Cited

U.S. PATENT DOCUMENTS

| | | |
|---|---|---|
| 6,675,156 B1 | 1/2004 | McIntyre et al. |
| 7,089,083 B2 | 8/2006 | Yokoo et al. |
| 7,505,892 B2 | 3/2009 | Foderaro |
| 2003/0028498 A1 | 2/2003 | Hayes-Roth |
| 2009/0082879 A1 | 3/2009 | Dooley et al. |

FOREIGN PATENT DOCUMENTS

WO          2007041674         4/2007

OTHER PUBLICATIONS

Yi-Chen Hsu, Affective Interfaces of Embodied Conversational Agents, Doctoral Thesis, The University of New South Wales, Oct. 2011, pp. 1-291.*
Prendinger, et al., Scripting and Evaluating Affective Interactions with Embodied Conversational Agents, Künstliche Intelligenz (KI) Zeitschrift, vol. 1, 2004, pp. 4-10.*

\* cited by examiner

*Primary Examiner* — Wilbert L Starks
(74) *Attorney, Agent, or Firm* — McDonnell Boehnen Hulbert & Berghoff LLP

(57) ABSTRACT

Methods and systems for robot and user interaction are provided to generate a personality for the robot. A robot may access a user device to determine or identify information about a user, and the robot may be configured to tailor a personality for interaction with the user based on the identified information. A robot may further receive data associated with the user to identify the user, such as using speech or face recognition. The robot may provide a personalized interaction or response to the user based on the determined information of the user. In some examples, a robot's personality or personalization can be transferred from one robot to another robot, or information stored on one robot can be shared with another robot over the cloud.

18 Claims, 10 Drawing Sheets

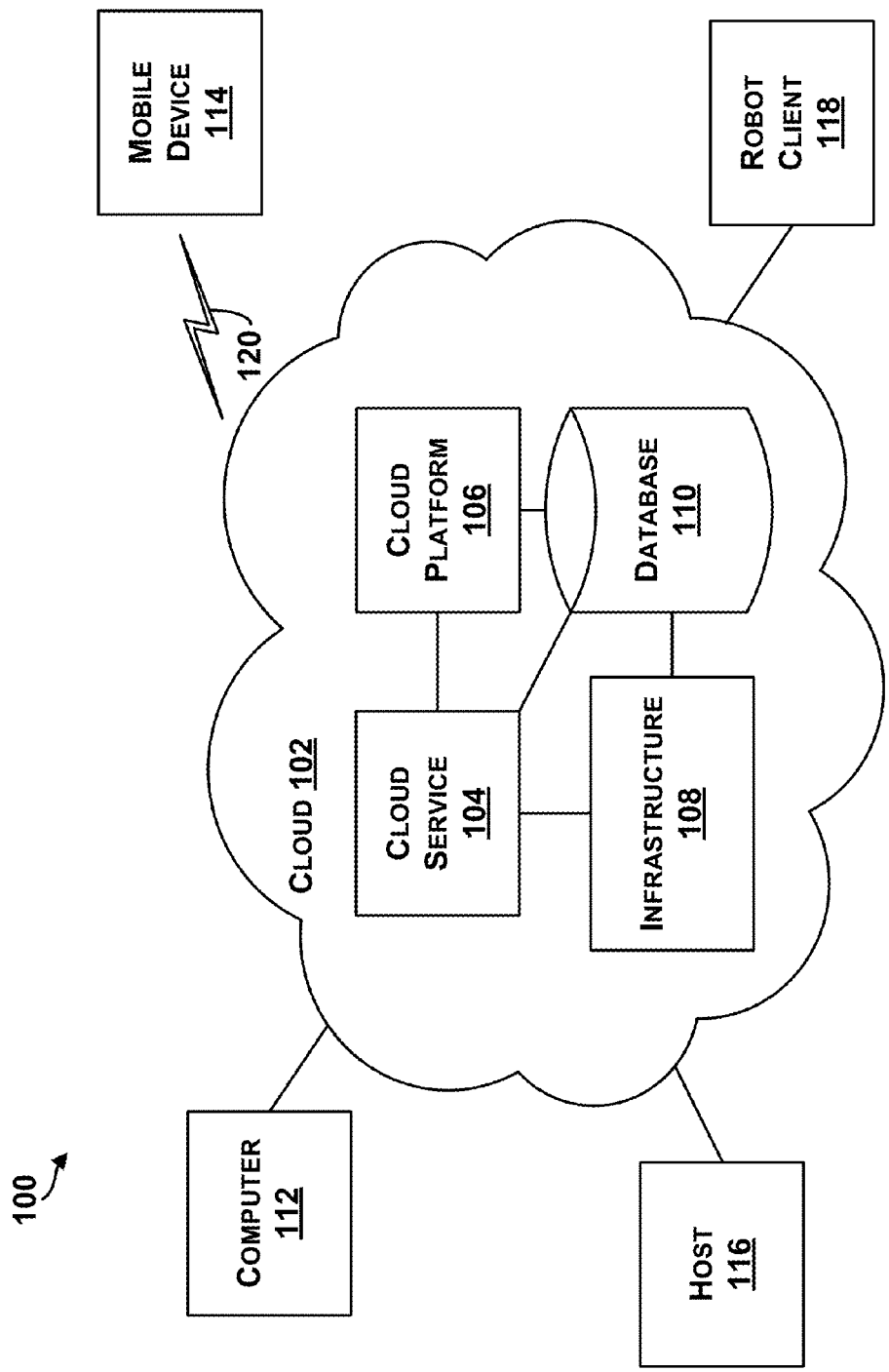

METHODS AND SYSTEMS FOR ROBOT PERSONALITY DEVELOPMENT

CROSS-REFERENCE TO RELATED APPLICATIONS

The present disclosure claims priority to U.S. Patent Application No. 61/483,295 filed on May 6, 2011 and to U.S. Patent Application No. 61/596,026 filed on Feb. 7, 2012, the entire contents of which are herein incorporated by reference.

BACKGROUND

This disclosure relates to a robot imbued with a personality, or personalities. In particular, but without limitation, the disclosure provides for a robot that operates with personality attributes and related capabilities drawn from cloud computing capacities. Personality may be thought of as personification in the sense of human characteristics or qualities attributed to a non-human thing. A robot can be programmed to provide a desired look as well as interactability for the robot, which may be subject to change by the user or by the robot itself, such that the robot interface is customized to provide a desired personality for the robot. The robot personality is further disclosed as being sharable across a number of robots in varying locations.

Cloud computing refers to provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud."

Cloud computing has been referred to as "client-server computing," however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

In one example, a user may open a browser and connect to a host of web servers that run user interface software that collect commands from the user and interpret the commands into commands on the servers. The servers may handle the computing, and can either store or retrieve information from database servers or file servers and display an updated page to the user. Through "cloud computing," data across multiple servers can be synchronized around the world allowing for collaborative work on one file or project, from multiple users around the world, for example.

SUMMARY

This disclosure provides methods and systems for robot-user interaction, where, for instance, a robot may be programmed to operate according to a specific profile or personality for a given user, and may have a certain look (e.g., visual interface) and feel in the way of attributes (e.g., data stored controlling actions) which are unique or even idiosyncratic to that robot. The personality could be multifarious, in the sense of multiple personalities, which may be selected by the robot according to cues or circumstances, or a personality could be selected by a user (a human). The robot may be programmed to take on the personality of real-world people (e.g., behave based on the user, a deceased loved one, a celebrity and so on) so as to take on character traits of people to be emulated by a robot.

The robot personality may also be modifiable within a base personality construct (i.e., a default-persona) to provide states or moods representing transitory conditions of happiness, fear, surprise, perplexion (e.g., the Woody Allen robot), thoughtfulness, derision (e.g., the Rodney Dangerfield robot), and so forth. These moods can again be triggered by cues or circumstances detected by the robot, or elicited on command.

The personality and state may be shared with other robots so as to clone this robot within another device or devices. In this manner, a user may travel to another city, and download within a robot in that city (another "skin") the personality and state matching the user's "home location" robot. The robot personality thereby becomes transportable or transferable.

The present disclosure in one form provides a customizable robot capable of having personalized attributes or characteristics. These may be conversational interactions (audio) as well as visual (stance, movements, twitches, facial movements). The customizable robot may further have the ability for improvisation or extrapolation based upon the selected personality, using clues from the human(s) interacting with the robot, or drawn from surroundings and circumstances. This interaction can be passive, i.e., responding to the human user, as well as proactive, in the sense that the robot initiates some conduct or interaction.

The disclosure herein further provides a software system and related hardware, including a basic application robot and an interface for data and/or command input for developing or loading a personality or personalities for that application. In another embodiment, the disclosure provides for a robot that is transferable, or dissociable, from whatever its "original" physical manifestation may be, such that it can be sent over a transmission network (e.g., the Internet) and downloaded (materialized) or extracted (dematerialized) in different robotic bodies (or skins). Thus, the robot personality may be cloned and readily transported, or stored for that matter. In a sense, this provides for a kind of teleportation capability for the robot.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, any type of devices may be used or configured to perform logical functions in any processes or methods described herein.

In yet further examples, any type of devices may be used or configured as means for performing functions of any of the methods described herein (or any portions of the methods described herein).

In one aspect, an example method includes a first device associated with a robotic apparatus obtaining information from a second device, and the information relates to communication between a user and the second device. In addition, the first device is configured to interact with the user. The method also includes, in response to obtaining the information, the first device processes that information for an estimated personality, and based on the estimated personality, the first device modifies the robotic apparatus to provide the personality.

In another aspect, an example device comprises a robotic apparatus or presence having a processor and sensors to perform the functions of obtaining information from a second device, wherein the information relates in part to communication between a user and the second device. In addition, the information is also obtained from the vicinity of the robotic presence. In response to obtaining the information, an estimated personality is generated, and based on the estimated personality, the personality is adopted or incorporated in the robot presence.

In another aspect, an example system includes a non-transitory computer-readable medium having stored therein instructions executable by a computing device to perform functions of obtaining information regarding a potential personality for interaction with a human. In response to obtaining the information, the exemplary system performs the functions of estimating a personality; and based on the estimated personality, incorporating the estimated personality into an interface which interacts with a user.

The foregoing summary is illustrative only and is not intended to be in any way limiting. In addition to the illustrative aspects, embodiments, and features described above, further aspects, embodiments, and features will become apparent by reference to the Figures and the following Detailed Description.

BRIEF DESCRIPTION OF THE FIGURES

FIG. 1 is an example system for cloud-based computing.

DETAILED DESCRIPTION

Figure 2A:
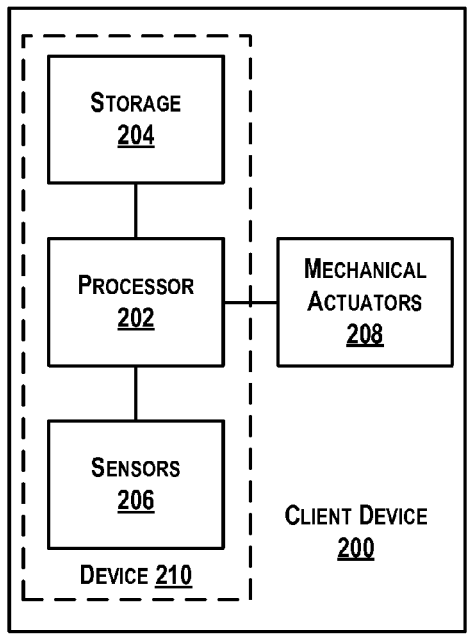
FIG. 2A illustrates an example client device.

In the following detailed description, reference is made to the accompanying Figures, which form a part hereof. In the Figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure includes, inter alia, methods and systems for robot and user interaction over the cloud. Within examples, cloud-based computing generally refers to networked computer architectures in which application execution and storage may be divided, to some extent, between client and server devices. A robot may be any device that has a computing ability and interacts with its surroundings with an actuation capability (e.g., electromechanical capabilities). A client device may be configured as a robot including various sensors and devices in the forms of modules, and different modules may be added or removed from robot depending on requirements. In some examples, a robot may be configured to receive a second device, such as mobile phone, that may be configured to function as an accessory or a "brain" of the robot.

In examples described herein, a robot may interact with the cloud to perform any number of actions, such as to share information with other cloud computing devices. Within examples, a robot may interact with a user in a manner that is based upon many types of received information. A robot may access a user device to determine or identify information about a user or related to the user, and the robot may be configured to tailor a method of interaction with the user based on the identified information. A robot may further receive data associated with the user to identify the user, such as using speech or face recognition. The robot may provide a personalized interaction or response to the user based on the determined information of the user. In further examples, a robot may receive inputs from a user through touch and associate the inputs with a personality for interaction with that particular person.

In some examples, the robot's personality, personification or personalization can be reflected in a default profile, which can then be modified. In particular, the robot may gain access to information regarding the user, the immediate environment or circumstances, through a cloud and/or a network. The robot thus would be linked to a cloud to gain access to information stored in the cloud, extracting that information depending upon analysis of inputs being received by the robot.

In some instances, the "default user-profile" may simply be referred to as a "user-profile." Further, the user-profile may be linked to other profiles that the user has created, as on social networking sites, such that the robot can access up-to-date and accurate information regarding the user. The user-profile may include information corresponding to the user's personality, history, lifestyle, preferences, and/or predispositions. The robot may use such information when interacting with the user.

1. CLOUD COMPUTING ARCHITECTURE

Referring now to the Figures, FIG. 1 is an example system 100 for cloud-based computing. Cloud-based computing generally refers to networked computer architectures in which application execution and storage may be divided, to some extent, between client and server devices. A "cloud" may refer to a service or group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud based application. In addition, dividing application execution and storage between the client and server devices allows more processing to be performed by the server devices taking advantage of server devices processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more of fewer components, and each of the cloud service 104, the cloud platform 106, the cloud infrastructure 108, and the database 110 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the infrastructure 108.

The system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer), and the mobile device 114 may be any type of mobile computing device (e.g., laptop, mobile telephone, cellular telephone).

The host 116 may be any type of computing device or transmitter including a laptop computer, a mobile telephone, that is configured to transmit data to the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, infrared sensors, optical sensors, biosensors, Radio Frequency identification (RFID) systems, wireless sensors, and/or compasses, among others, for example.

In addition, any of the client devices may include an integrated user-interface (UI) that allows a user to interact with the device. For example, the robot client 118 may include various buttons and/or a touchscreen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

2. EXAMPLE ROBOT ARCHITECTURE

FIG. 2A illustrates an example client device 200. In one example, the client device 200 is configured as a robot. In some examples, a robot may contain computer hardware, such as a processor 202, memory or storage 204, and sensors 206. For example, a robot controller (e.g., processor 202, computing system, sensors 206) may all be custom-designed for a specific robot. The robot may have a link by which the link can access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robot and storing program instructions. The processor 202 may be coupled to the storage 204 and may be configured to control the robot based on the program instructions. The processor 202 may also be able to interpret data from the various sensors 206 on the robot. Example sensors may include, smoke sensors, light sensors, radio sensors, infrared sensors, microphones, speakers, gyroscope, accelerometer, a camera, radar, capacitive sensors and touch sensors.

The client device 200 may also have components or devices that allow the client device 200 to interact with its environment. For example, the client device 200 may have mechanical actuators 208, such as motors, wheels 222, movable arms 220, that enable the client device 200 to move or interact with the environment.

In some examples, various sensors and devices on the client device 200 may be modules. Different modules may be added or removed from a client device 200 depending on requirements. For example, in a low power situation, a robot may have fewer modules to reduce power usages. However, additional sensors may be added as needed. To increase an amount of data a robot may be able to collect, additional sensors may be added, for example.

In some examples, the client device 200 may be configured to receive a device, such as device 210, that includes the processor 202, the storage 204, and the sensors 206. For example, the client device 200 may be a robot that has a number of mechanical actuators (e.g., a movable base), and the robot may be configured to receive a mobile telephone to function as the "brains" or control components of the robot. The device 210 may be considered a module of the robot. The device 210 may be physically attached to the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud, and when the mobile phone is placed into or coupled to the robot, the robot would be able to perform the downloaded action.

In some examples, the client device 200 may be coupled to a mobile or cellular telephone to provide additional sensing capabilities. The cellular phone may not be physically attached to the robot, but may be coupled to the robot wirelessly. For example, a low cost robot may omit a direct connection to the Internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the client device 200 may include mechanical robot features, and may be configured to receive the device 210 (e.g., a mobile phone), which can provide additional peripheral components to the device 200, such as any of an accelerometer, gyroscope, compass, GPS, camera, WiFi connection, a touch screen, that are included within the device 210.

Figure 2B:
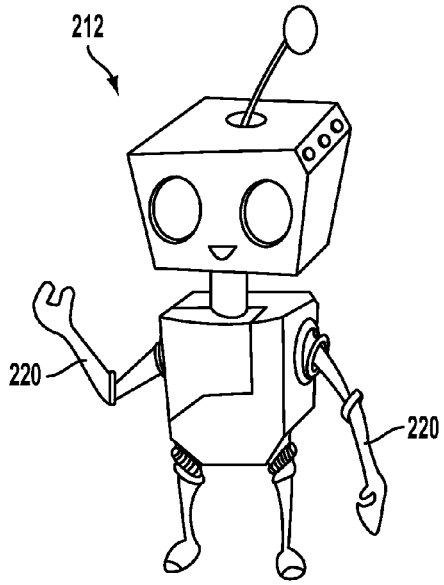
FIG. 2B illustrates a graphical example of a robot.

FIG. 2B illustrates a graphical example of a robot 212. In FIG. 2B, the robot 212 is shown as a mechanical form of a humanoid including arms, legs, and a head. The robot 212 may be configured to receive any number of modules or components, such a mobile phone, which may be configured to operate the robot. In this example, a device (e.g., robot 212)

can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

The mountable device 210 may further be configured to maximize runtime usage of the robot 212 (e.g., if the robot 212 could learn what happens to cause the user to turn the toy off or set the toy down, the device 210 may be configured to perform functions to counteract such occurrences).

Figure 2C:
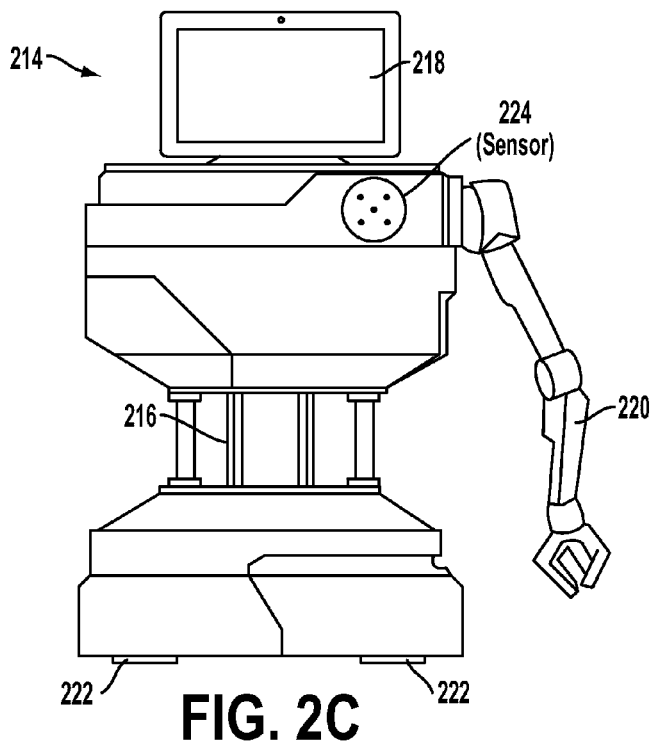
FIG. 2C illustrates another example of a robot.

FIG. 2C illustrates another example of a robot 214. The robot 214 includes a computing device 216, and a mechanical actuator 220. In this example, the computing device 216 may be a laptop computer or the equivalent thereof. Here, the robot has been provided with a video display or monitor 218, which may be coupled to sensors 224. The video monitor 218 could, as here, be used to project an image relating to the personality then being adopted by the robot 214. The sensors 224 may include a camera, infrared projectors, and other motion sensing or vision sensing elements. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management), to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples also include ROSJAVA. A robot operating system may include publish and subscribe functionality, and may also include functionality to control components of the robot, such as head tracking, base movement (e.g., velocity control, navigation framework).

3. ROBOT AND CLOUD INTERACTION

Figure 3:
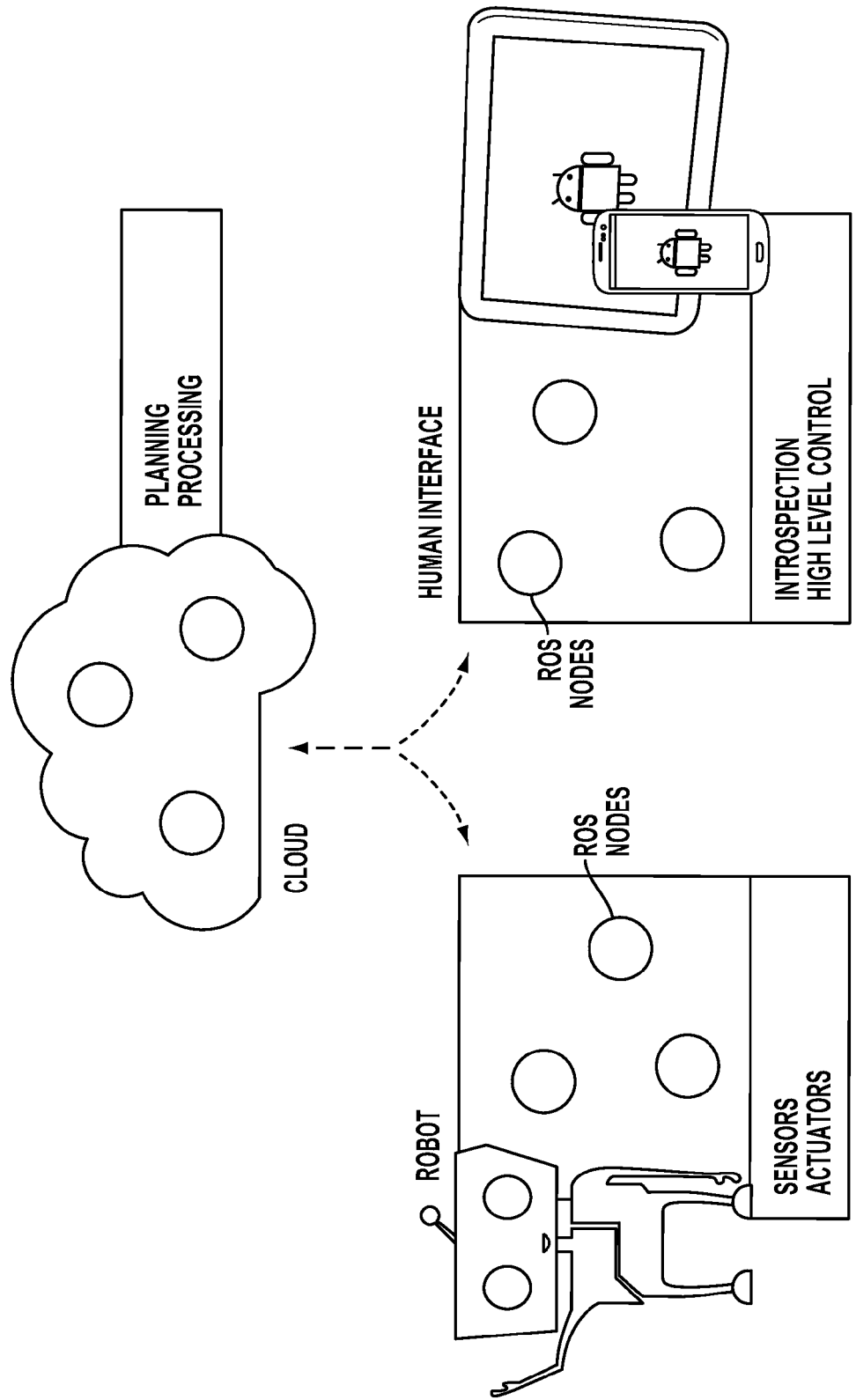
FIG. 3 illustrates an example of a conceptual robot-cloud interaction.

FIG. 3 illustrates an example of a robot-cloud interaction. A robot, such as a robot described and illustrated in FIG. 2A-C, may connect to a network of computers (e.g., the cloud), and may request data or processing to be performed by the cloud. In one example, the robot may include a number of sensors and mechanical actuators that may generally provide motor control for the robot. Outputs of the sensors, such as camera feeds, vision sensors, may be provided to the cloud, which can process the outputs to enable the robot to perform functions. The cloud may process a camera feed, for example, to determine a location of a robot, perform object recognition, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot.

In one example, the robot may send data to a cloud for data processing, and in another example the robot may receive data from the cloud. The data received from the cloud may be in many different forms. The received data may be a processed form of data the robot sent to the cloud. The received data may also come from sources other than the robot. For example, the cloud may have access to other sensors, other robots, and the Internet.

Figure 4:
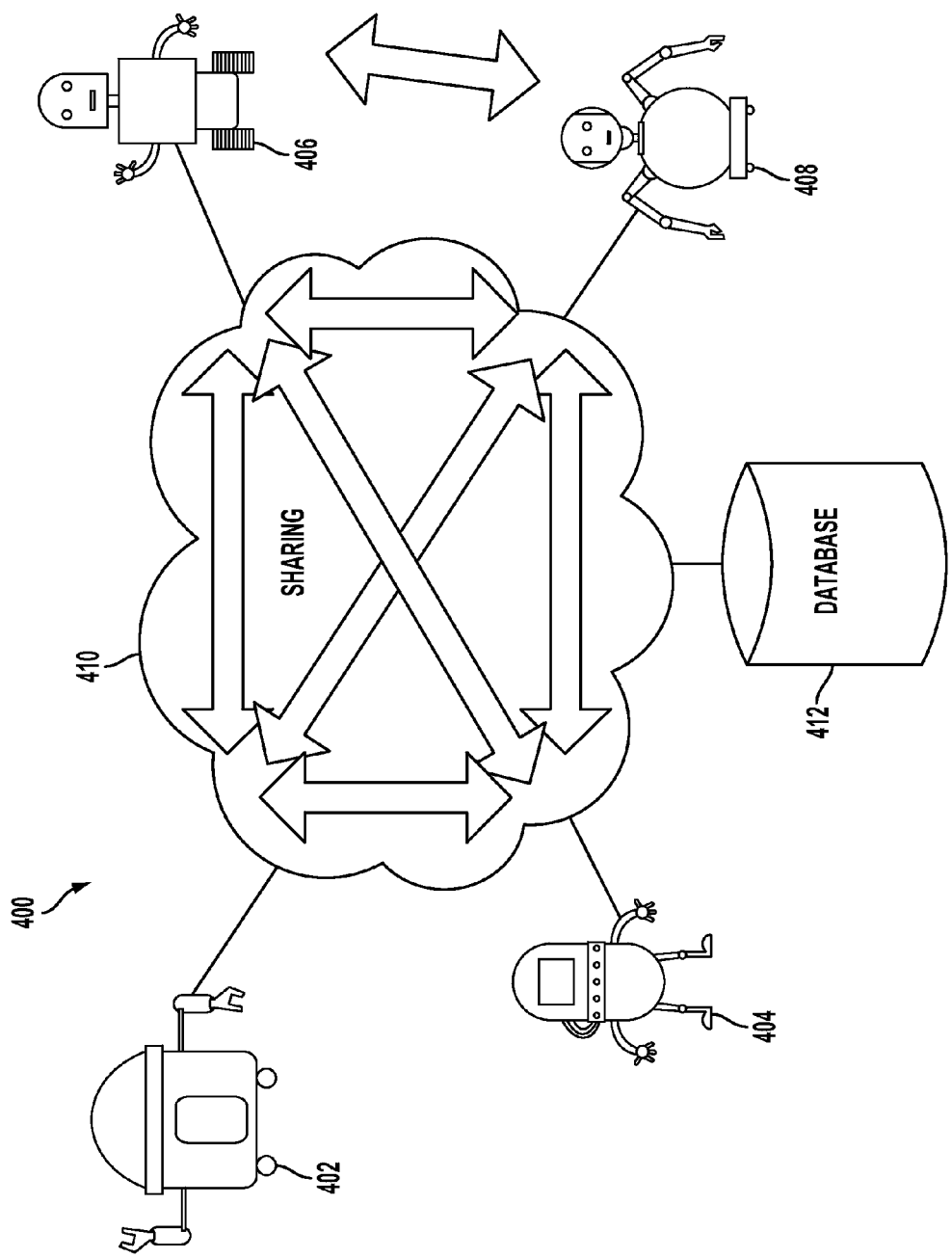
FIG. 4 is an example system in which robots may interact with the cloud and share information with other cloud computing devices.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be compiled into a larger data set. For example, the robot 402 may take a picture of an object and upload the picture to the cloud 410. An object recognition program in the cloud 410 may be configured to identify the object in the picture and provide data to all the robots connected to the cloud 410 about the recognized object, as well as possibly about other characteristics (e.g., metadata) of the recognized object, such as a location, size, weight, color. Thus, every robot may be able to know attributes of an object in a photo uploaded by the robot 402.

The robots 402, 404, 406 and 408 may perform any number of actions with an area, people, other robots. In one example, each robot 402, 404, 406 and 408 has WiFi or other network based connectivity and will upload/publish data to the cloud 410 that can then be shared with any other robot. In this manner, each robot 402, 404, 406 and 408 shares experiences with each other to enable learned behaviors. For example, the robot 402 may traverse a pathway and encounter an obstacle, and can inform the other robots 404, 406, and 408 (through the cloud 410) of a location of the obstacle. Each robot 402, 404, 406, and 408 will have access to real-time up to date data. In another example, the robot 404 can download data indicating images seen by the other robots 402, 406, and 408 to help the robot 404 identify an object using various views (e.g., in instances in which the robots 402, 406, and 408 have captured images of the objects from a different perspective).

In still another example, the robot 408 may build a map of an area, and the robot 402 can download the map to have knowledge of the area. Similarly, the robot 402 could update the map created by the robot 408 with new information about the area (e.g., the hallway now has boxes or other obstacles), or with new information collected from sensors that the robot 408 may not have had (e.g., the robot 402 may record and add temperature data to the map if the robot 408 did not have a temperature sensor). Overall, the robots 402, 404, 406, and 408 may be configured to share data that is collected to enable faster adaptation, such that each robot 402, 404, 406, and 408 can build upon a learned experience of a previous robot.

Sharing and adaptation capabilities enable a variety of applications based on a variety of inputs/data received from the robots 402, 404, 406, and 408. In a specific example, mapping of a physical location, such as providing data regarding a history of where a robot has been, can be provided. Another number or type of indicators may be recorded to facilitate mapping/navigational functionality of the robots 402, 404, 406, and 408 (e.g., a scuff mark on a wall can be one of many cues that a robot may record and then rely upon later to orient itself).

In one example, the cloud 410 may include, store, or provide access to a database 412 of information related to objects, and the database 412 may be accessible by all the robots 402, 404, 406, and 408. The database 412 may include information identifying objects, and details of the objects (e.g., mass, properties, shape, instructions for use, any detail that may be associated with the object) that can be accessed by the robots 402, 404, 406, and 408 to perform object recognition. As an example, information regarding use of an object can include, e.g., such as for a phone, how to pick up a handset, how to answer the phone, location of buttons, how to dial.

In addition, the database 412 may include information about objects that can be used to distinguish objects. For example, the database 412 may include general information regarding an object (e.g., such as a computer), and additionally, information regarding a specific computer (e.g., a model number, details or technical specifications of a specific model). Each object may include information in the database 412 including an object name, object details, object distinguishing characteristics, or a tuple space for objects that can be accessed. Each object may further include information in the database in an ordered list, for example. In further examples, the database 412 may include a global unique identifier (GUID) for objects identified in the database 412 (e.g., to enable distinguishing between specific objects), and the GUID may be associated with any characteristics or information describing the object. Thus, a robot may be configured to access the database 412 to receive information generally distinguishing objects (e.g., a baseball vs. a melon), and to receive information that may distinguish between specific objects (e.g., two different computers).

The database 412 may be accessible by all robots through the cloud 410 (or alternatively directly accessible by all robots without communication through the cloud 410). The database 412 may thus be a shared knowledge-base stored in the cloud 410.

Thus, in some examples, robots may share new or learned behaviors through the cloud 410. The cloud 410 may have a server that stores robot learned activities or behaviors resulting in a shared knowledge-base of behaviors and heuristics for object interactions (e.g., a robot "app store"). Specifically, a given robot may perform actions and build a map of an area, and then the robot can upload the data to the cloud 410 to share this knowledge with all other robots. In this example, a transportation of the given robot's "consciousness" can be made through the cloud 410 from one robot to another (e.g., robot "Bob" builds a map, and the knowledge of "Bob" can be downloaded onto another robot to receive knowledge of the map).

Thus, within examples, the robots 402, 404, 406, and 408 may share information through the cloud 410, and may access the database 412.

4. ROBOT-USER INTERACTIONS

As mentioned, robots (or any client computing device) may interact with the cloud and users to perform any number of functions. Example functions are described below.

a. Object Recognition

Figure 5:
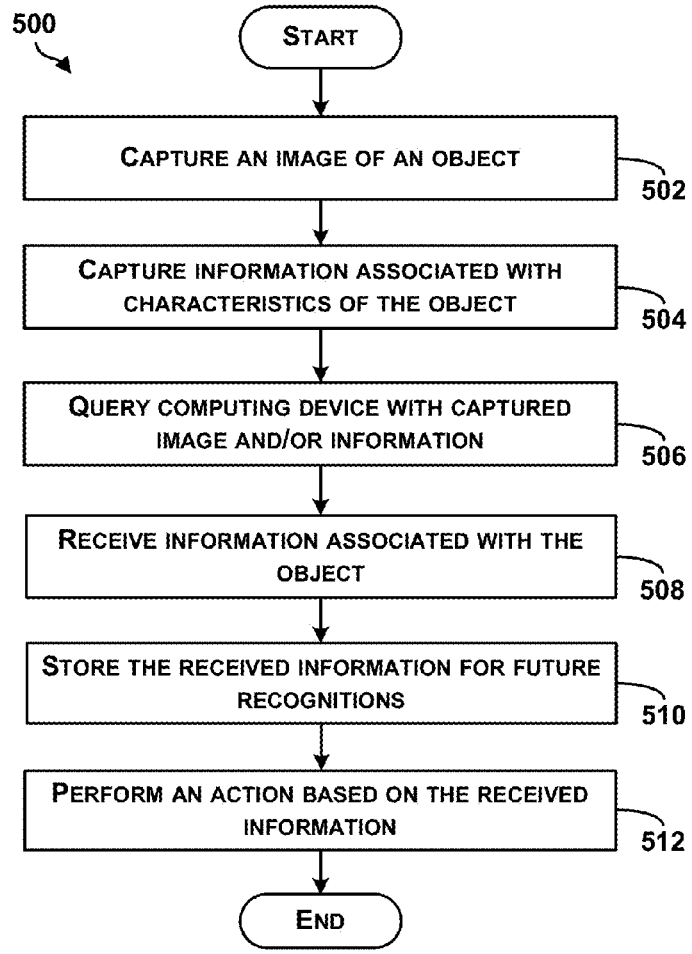
FIG. 5 is a block diagram of an example method of a robot interaction with the cloud to facilitate object recognition.

FIG. 5 is a block diagram of an example method of a robot interaction with the cloud to facilitate object recognition, in accordance with at least some embodiments described herein. Method 500 shown in FIG. 5 presents an embodiment of a method that, for example, could be used with the systems 100 and 400, for example, and may be performed by a device, such as another devices illustrated in FIGS. 1-4, or components of the device. Method 500 may include one or more operations, functions, or actions as illustrated by one or more of blocks 502-512. Although the blocks are illustrated in a sequential order, these blocks may also be performed in parallel, and/or in a different order than those described herein, unless dictated by a necessary earlier step. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 500 and other processes and methods disclosed herein, each block in FIG. 5 may represent circuitry that is wired to perform the specific logical functions in the process.

At block 502, the method 500 includes capture an image of an object. In an example, a robot may capture many images of objects using any number of sensors, such as a camera (still pictures or video feeds), infrared projectors.

At block 504, the method 500 includes capture information associated with characteristics about the object. For example, a robot may optionally determine or record a weight, dimensions, a texture, color, or any type of physical attribute of the object.

As another example, in an instance in which the robot may communicate with the object, the robot may capture additional data of the object, such as by accessing memory of the object. For instance, if the object has communication capabilities (such as WiFi, Bluetooth, infrared or other wireless or wired methods), the robot may communicate with the object to determine any type of data. Additionally, the object may have serial/parallel ports through which the robot may communicate with the object.

At block 506, the method 500 includes query a computing device with the captured image and/or information. As an example, the robot may query the cloud with a captured image by sending the captured image to the cloud and requesting information about the image, such as an identity of the image or information associated with characteristics of objects in the image. Alternatively, the robot may query another robot directly to request information about the object, such as an image of an alternate view of the object.

At block 508, the method 500 includes receiving information or retrieving information associated with the object. For example, the robot may receive data from the cloud indicating an identity of an object in the image, or other information related to or associated with characteristics about the object. In some examples, the cloud may perform object recognition on the uploaded image or video. For example, if a picture was taken in a living room, the cloud may be able to identify a television. The cloud may even be able to recognize an exact model of television, and provide information regarding instructions for use of the television.

At block 510, the method 500 includes storing the received information for future recognitions. For example, after receiving the information from the cloud, the robot would be able to recognize the object in the future enabling the robot to learn and adapt.

At block 512, the method 500 includes performing an action based on the received information. The action may vary based on a type of received information, or the query that is presented by the robot. As an example, the robot may query the cloud to identify an object and details of the object to enable the robot to interact with the object.

As an additional or alternative method for performing object recognition, objects may be tagged with a type of identifier (e.g., radio frequency identification (RFID) chip, near field communication chip (NFC), bar code), so that a robot may include an application enabling the robot to identify the object based on the identifier. The identifier may provide information about the object including an identification, details of the object (mass, color, type, brand), a location of the object. In some examples, objects may emit beacons that can be received by the robots to determine existence/identification/location of the object. In this example, a physical environment may be instrumented with beacons in forms of NFC, RFID, QR codes, to enable a robot to localize and identify objects. Beacons may be stationary beacons or moving beacons (RFID in an employee's ID badge) to perform tracking of objects.

Figure 6:
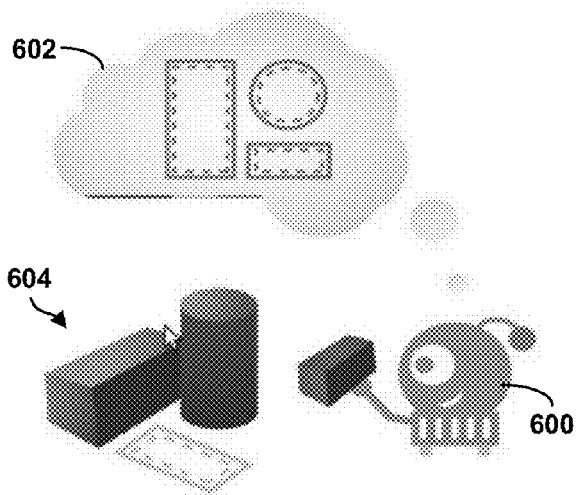
FIG. 6 is an example conceptual illustration of a robot interacting with a cloud to perform object recognition and interaction.

FIG. 6 is an example of a robot 600 interacting with a cloud 602 to perform object recognition and interaction, or other functions as described in FIG. 5. The robot 600 may engage in image and information capture in an interaction with an object (such as any of objects 604). The robot 600 then can query the cloud 602, and interact with the cloud 602 as described above to further receive information on the relevant object 604, and then interact with the object in some manner, as performing an action thereon (such as picking it up).

In some examples, the method 500 to facilitate object recognition may be a higher-level service (e.g., higher in a software stack), such that details and specifics for how to recognize an object may be performed by the cloud. The robot may be configured to perform actions/functions based on a result of object recognition, rather than or in addition to, performing functions regarding recognizing an object. As an example, using the method 500, the robot may execute software to perform function calls, such as GetObject( ), which may return information associated with an object (e.g., a cereal box), or PickUpObject( ), which may cause the robot to pick up the object. Enabling function calls and operation of robots through the cloud facilitates control and operation of the robot without having to control or operate various sensors/mechanical aspects of the robot, for example.

Figure 7:
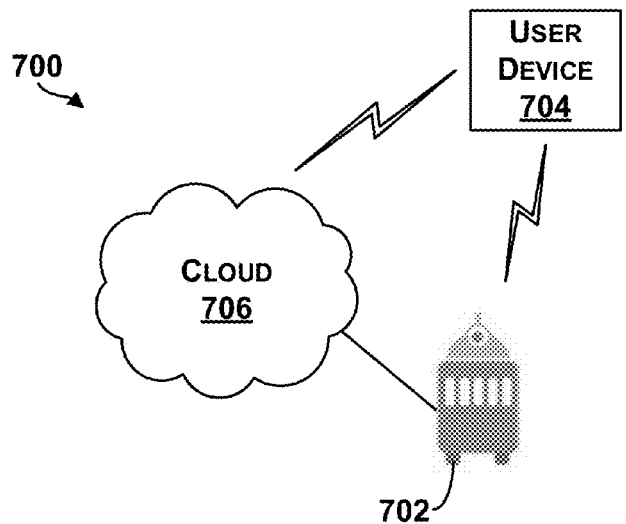
FIG. 7 illustrates an example system in which a robot may access a user device either directly (using wired or wireless connections) or through a cloud.

In one example, an object may include a user. Thus, robots may perform user recognition using any of the functions described above.

b. Learning and Adaptation to a User Based on Information Associated with User Devices FIG. 7 illustrates an example system 700 in which a robot 702 may access a user device 704 either directly (using wired or wireless connections) or through a cloud 706. For example, the user device 704 may be coupled to the cloud 706 (using wired or wireless connections), and the robot 702 may access the user device 704 through the cloud 706.

The user device 704 may be any of a computer (desktop or laptop), a mobile phone, a cellular telephone, a personal digital assistant (PDA), a tablet computer, or other mobile computing devices. Still further, the user device 704 may include other devices such as a digital video recorder (DVR), television computing devices, or any type of cloud computing device or device with connectivity to the cloud.

The robot 702 may access the user device to determine or identify information about a user, and the robot 702 may be configured to tailor a method of interaction with the user based on the identified information. There are many examples of types of information that the robot 702 may access including, but not limited to, a user's calendar to determine information associated with activities the user performed (or was scheduled to perform, e.g., who the user met with that day), a user's email, text messages, or other electronic correspondence. Other examples of types of information include identifying recently accessed documents on a computer, accessing a user's call log (e.g., missed, received, or dialed calls), accessing a user's Internet browser history, accessing a user's DVR to determine television viewing schedule.

The robot 702 may use any of the determined or identified information in many different ways to determine a personality to assume. For example, the robot 702 may analyze any of the data to determine characters, a diction, word-choice, or sentence structure of correspondence, and may make an inference of the user's current mood or attitude, in order to then select or modify a personality.

Adoption of a personality, or some personification attributes, could be more direct, such as a simple user command to adopt a character by name: "Be mom"; "Become Gwynneth"; "Adopt persona Beta." The character (personality) may be a program already stored, or it could be something in the cloud. If the later, the robot would interact with the cloud to pull sufficient information regarding the "new" persona to thereby recreate a simulacrum for the robot. The information for the persona could also come from a user device. Such as, in response to a "Be mom" command, "mom" may not be known to the robot. The robot processor can then search user devices for information about "mom."

Figure 8A:
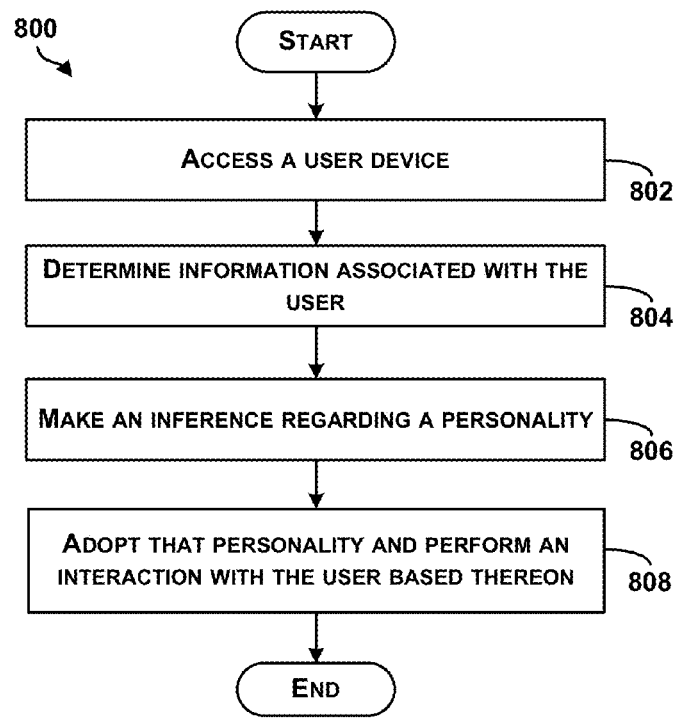
FIG. 8A is a block diagram of an example method of a robot accessing a user device to facilitate interactions with the user, in accordance with at least some embodiments described herein.

FIG. 8A is a block diagram of an example method of a robot accessing a user device to facilitate interactions with the user, in accordance with at least some embodiments described herein. Method 800 shown in FIG. 8A presents an example of a method that, for example, could be used with the systems 100 and 400, for example, and may be performed by a device, such as another device illustrated in FIGS. 1-4, or components of the device. In addition, each block in FIG. 8A may represent a module, a segment, or a portion of program code, which includes one or more instructions executable by a processor for implementing specific logical functions or steps in the process. The program code may be stored on any type of non-transitory computer readable medium, for example, such as a storage device including a disk or hard drive.

At block 802, the method 800 includes access a user device. For example, a robot may access a user device (e.g., mobile phone, PC, electronic picture frame) either directly or indirectly through a cloud.

At block 804, the method 800 includes determining information associated with the user. For example, the robot may access information on a user's mobile phone, such as a calendar application, email, call logs. The robot may further access contact data, user accounts, third party applications, on the mobile phone to determine information associated with the user. The robot may further access pictures from a user's mobile phone, or a front-facing camera on a mobile phone (to access a current picture or view of the mobile phone). A user may opt-in to allow the robot to determine access to information, and the user may indicate a preference or priority of information for which the robot may access.

At block 806, the method 800 includes making an inference regarding a personality. For example, the robot may be able to determine "mom's" voice from recordings, and further how the user interacts with "mom" from text messages and recordings. A photograph of "mom" may result in a display for the monitor of FIG. 2C.

The robot may make the inference or selection in real-time using artificial intelligence based on an analysis of the data.

At block 808, the method 800 includes applying the persona determined or retrieved, and perform an interaction with the user based thereon.

The robot may access a database to determine an action to perform, or to determine how to perform an interaction with the user based on the user's input.

The method 800 in FIG. 8A may be performed by the robot sending a query to the cloud requesting information indicating or associated with a mood of the user. In this regard, the cloud or component in the cloud may perform actions including accessing a user device, determining information associated with the user from the user's device, making an inference regarding a desired persona from the user's mood. Subsequently, the cloud may provide a response to the robot's query indicating the persona indicia, or indicating information associated with the persona that the robot may use to make inferences regarding the persona. Thus, actions or functions of the method 800 may be performed by the robot, the cloud (or components of the cloud) in a distributed manner. Alternatively, all actions or functions of the method 800 may be performed locally by the robot.

Still as another alternative example, actions or functions of the method 800 may be performed by the robot, which may make queries to the cloud to facilitate performing the functions. For instance, the robot may make the inference regarding the mood of the user, however, the robot may query the cloud to request an analysis of an email, and based on the analysis, the robot may make the inference regarding the mood of the user, and a resulting personality to adopt.

Figure 8B:
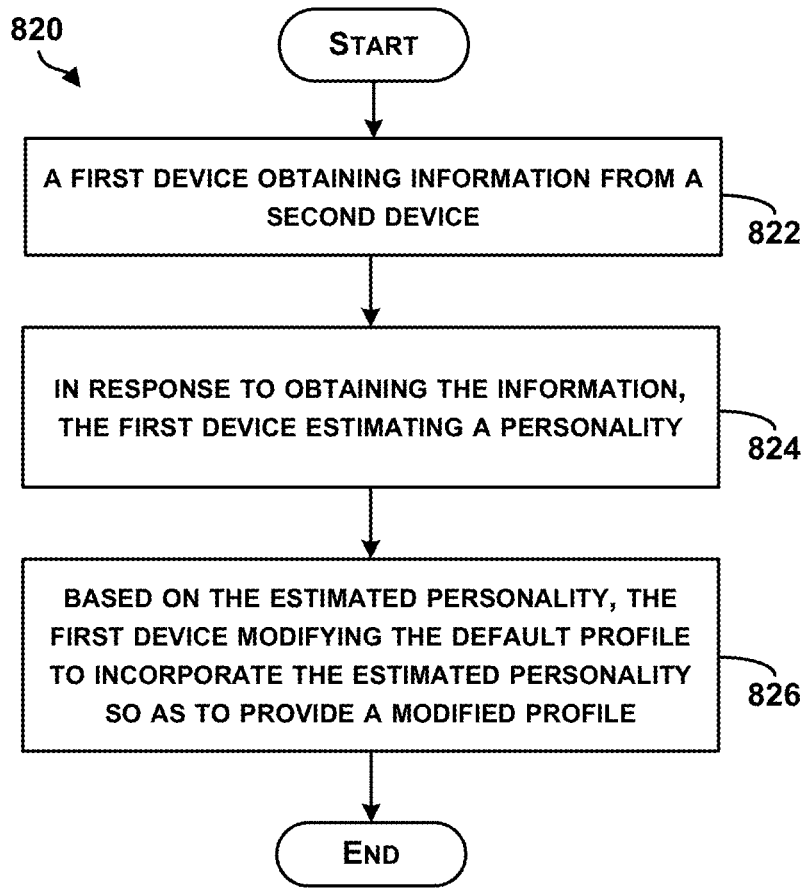
FIG. 8B is a block diagram of an example method of first device obtaining information from a second device to facilitate interactions with the user, in accordance with at least some embodiments described herein.

FIG. 8B is a block diagram of another example method of a robot accessing a user device to facilitate interactions with the user, in accordance with at least some embodiments described herein. Method 820 shown in FIG. 8B presents an example of a method that, for example, could be used with the systems 100 and 400, for example, and may be performed by a device, such as other devices illustrated in FIGS. 1-4, or components of the device. Accordingly, in some examples, Method 820 may be carried out by a robot. As further described below, the robot may have a computing ability configured to interact with an ambient environment using an actuation capability. In addition, the robot may carry out each block in FIG. 8B, which may also represent a module, a segment, or a portion of program code, which includes one or more instructions executable by a processor for implementing specific logical functions or steps in the process. The program code may be stored on any type of non-transitory computer readable medium, for example, such as a storage device including a disk or hard drive.

At block 822, the method 820 includes a first device obtaining information from a second device. The first device may be a robot, and the second device may be a device of a user (e.g., a user's mobile phone). The information may relate to communication between the user and the second device. Examples include phone calls made by the user, emails sent by the user.

In some examples, the first device may be configured to interact with the user or environment according to a default profile created for the user. A default user-profile may include a database with information corresponding to a user's personality, lifestyle, preferences, and/or predispositions. A default user-profile may also be synched to a profile on a social networking site such that certain information in the default user-profile is provided by the user. In some examples, a robot may use a user-profile to obtain information from a user device, such as a personal computer (e.g., a laptop computer and/or a tablet computer).

A robot may also obtain information from a user device communicating through a cloud. For example, referring to FIG. 1, a robot may utilize information in the user-profile to interact with a cloud such as cloud 102 shown in system 100. Alternatively, a robot may access cloud 102 to access the user-profile stored on cloud 102. A user-profile may include information identifying the mobile device 114 and the computer 112 each coupled to the cloud 102. The user-profile may also have information indicating when the user interacts with mobile device 114 and computer 112. A robot may use the user-profile to determine when to interact with the cloud 102 and/or with other robots (such as robot client 118) directly to obtain communication between the user and mobile device 114 and computer 112.

At block 824, the method 820 includes in response to obtaining the information, the first device estimating a persona. In some examples, the robot may analyze the user's interaction with a user device according to a user-profile and make an estimate of the desired personality. In particular, the user-profile may be a created and stored as a database including specific characters, diction, word-choice, and/or sentence structures of the user's correspondence with the user device which can be indicative of an estimated personality. The robot may be able to take specific language identified above from the user device (e.g., a personal computer, a mobile telephone, a tablet computer, and/or a landline telephone) and search the database for a matching personality trait. For example, a robot may identify a combination of words such as "I'm so tired," and/or "we're absolutely exhausted" in a user's post found on a social networking site to establish a compatible personality. The robot may search for these characters, diction, word-choice, and/or sentence structures in a user-profile stored in a database or multiple databases and find corresponding features to generate the appropriate persona.

In some examples, the robot may analyze a user's interaction with a user device to determine a context and estimate a personality. A context may be determined based on one or more "context signals." A context signal may be any signal that provides a measurement or otherwise provides information pertaining to a state or an environment associated with a user. Many types of information from many different sources may be used as context signals or provide information from which context signals may be determined. For some examples, a context signal may include information relating to a time of day, a location, weather, and/or a particular event. Similar to specific characters, diction, word-choice, and/or sentence structures that may be stored in a database with respective moods, contexts may also be associated with specific indicators being detected by the robot. Those skilled in the art will understand that the above list of possible context signals and sources of context information is not intended to be limiting, and that other context signals and/or sources of context information are possible in addition, or in the alternative, to those listed above. Further, it should be understood that a robot with a computing ability configured to interact with an ambient environment using an actuation capability may be able to identify any of the context signals provided in the list above.

In some occurrences, a robot may be configured to identify a context of the user's location to estimate a personality. For example, a robot may utilize location services available on the user's cell phone and retrieve information corresponding to the user's location. From this, the robot may determine that the user is at a car dealership, and may then adopt the personality of a negotiator for a new car purchase. Alternatively, the robot may also identify the user's location when the user operates a personal computer or tablet computer with location-based platforms and programs providing for the ability to locate the computer on a geographical map. Responsive to determining the location of the user, the robot may look-up corresponding details associated with the user's location in a user profile. The robot may use this information to estimate the appropriate personality that may be useful.

In some examples, a robot may identify a context of the user's location and access a cloud to estimate a personality. For example, the robot may identify a user's location through the user's interaction with a laptop computer with similar location platforms as described in the example above. The robot may determine the user's location to be in the user's office and access an "office" database located on a cloud to estimate a personal assistant personal for a user. Further, the "office" database may be updated by multiple other devices such as other robots interacting with the user. In particular for this example, the robot may query the office database and identify a high number of uncompleted tasks listed in the user's schedule and compare the number of uncompleted tasks to other records in the office database indicating prior situations and how the user dealt with the situation based on the number of uncompleted tasks. The robot may use this information to estimate the personality best suited for the user to the tasks at hand (cajoling, strident, understanding but firm, hopeful).

In some examples, a robot may use nearby objects to determine a context of the environment surrounding the user and estimate a personality. Further, the robot may operate with contextual awareness such that a robot may search certain objects in a particular scene to identify the location of the robot and user. For instance, the robot may identify the user's refrigerator and query the refrigerator in a user-profile, such as compiled in a cloud network. That may include an inventory of the contents, and expiration dates of products in the refrigerator. The robot may then adopt a persona of the user's mother, and indicate that "it is time to clean out the refrigerator, honey."

In still another example, a context of the time of day may be used to estimate the personality to match the user. At night, a robot may be configured to move more slowly and make less noise, to be quiet than as compared to operations during the day. The robot may recognize an alarm application that the user is programming on a cell phone. The robot may determine an associated context of the time of day based on a context stored in a user profile. The context of the time of day may further map to historical data records indicating that the context is past the user's normal bed time. In another example, in the morning, the robot may recognize the user's alarm going off on the cell phone and may determine from prior data that the user is not "a morning person," and map to the user's mood for "need coffee." The robot may responsively offer coffee to a user as opposed to a soft drink, with little or no conversation.

In another example, the robot may identify a context of the weather and estimate the personality to go along with the weather. For instance, the robot may access weather applications and determine that the weather includes rain in the forecast. The robot may look up the context of rain in a weather table found in a user-profile (which may be found on a cloud-network). Search results may indicate data records corresponding to prior results that may all indicate that the user is grumpy when the weather includes rain. The user-profile may be for the robot to then perform uplifting tunes from "Annie," to evoke positive reinforcement responses from the user when it rains. Using the information in the user-profile, the robot may adopt a butler persona (e.g., Bruce Wayne's Alfred), and nicely offer an umbrella to the user as the user is leaving for work, or based on what the user is wearing, the robot may offer suggestions to the user based on the weather. Thus, the robot may take a context of weather into account when estimating a personality.

As still another example, a mood recognition database (or information from a mood recognition databank) may be provided to a robot (or may be made accessible by the robot) to enable the robot to perform a search for personality indicators locally. As an example, if a robot is in a work setting, a work database for mood recognition may be provided to the robot to enable a personality recognition process to be performed more quickly than having the robot search within a database for all settings. Any situational or contextual information of the robot may be used to select a persona database to provide to the robot. As other examples, a time of year, context of a conversation, environment, may be used individually or in combination to select a persona database to provide to the robot.

In some examples, the robot may identify a language of communication between a user and a user device to estimate the mood of the user. The language may be looked up in a user profile on a server to identify a specific context. "Ah, we are speaking French today," so a French-persona is adopted. Further, the context may map to a custom of the user which may further be associated with a particular language: "Ah, we are wearing our French beret today."

In some examples, a robot may utilize the user-profile to determine a user's relationship with another robot and estimate the user's desired personality based on the user interacting with the other robot. For example, the user-profile may be created in a database that indicates the user's mood when interacting with certain robots. For instance, referring back to FIG. 4, the robot may search the database and find that the user is typically frustrated after interacting with robot 402. A robot may anticipate and/or learn when the user interacts with robot 402 and estimate the appropriate personality to adopt. For example, the robot 406 may learn that the user is interacting with robot 402, and this is unlikely to end well. The robot 406 may update the user-profile to indicate that the user will likely be in a frustrated mood, and adopt a personality to deal with the frustration. Alternatively or in addition, the robot 406 may inform other robots directly as shown in FIG. 4 with robot 408.

At block 826, the method 820 includes modifying the default user-profile to incorporate the estimated personality so as to provide a modified persona. This can be a transitory modification or something more permanent. For example, the robot may prepare food for the user using peanut oil. The user, who may be allergic to peanut-based foods, may eat the meal and have an allergic reaction. The user may further scold the robot for cooking the meal with peanut oil. Scolding may be considered a negative feedback response where the user is directing a negative reaction toward the robot for an action that the robot committed. On the other hand, a positive feedback response may be a positive reaction toward the robot for an action that the robot committed. In this example above, the robot may permanently modify information in the user-profile to include the user's allergic reaction to peanut and avoid anything to do with peanuts in the future.

In some examples, the default user-profile may be modified by the user and the robot. For example, the user may be allergic to mangos and may update a user-profile to include such information. Simultaneously, a robot may update the user-profile to include that the user is also allergic to peanuts. When the dining fare is French cooking, the robot may be queued to adopt the persona of Julia Child.

In some examples, various robots may share information on a cloud to estimate the mood of the user and maintain a single user-profile. For example, referring to FIG. 4, robots 402, 404, 406, and 408 may provide updates to the user-profile simultaneously. In some instances, there may be one primary input point to avoid conflicting information amongst differing estimated moods provided by multiple robots. For example, robot 408 may be the only robot with write privileges to a user-profile stored in the database 412. The other robots 402, 404, and 406 may only have read privileges and may be limited to requesting changes to the user-profile. A request may be processed by robot 408 through a logic sequence to determine whether or not grant such the request.

In some examples, conflicting information may be gathered amongst multiple robots and this may lead to conflicting requests to modify the personality. Upon recognizing a conflict, the robot 408 may trigger a sequence of events to gain more information from the user before making any modifications to the user-profile. For example, robot 408 may determine conflicting estimated personality indicators from robot 406 and 402 and responsively instruct robot 404 to interact with the user to help estimate the desired persona.

Figure 8C:
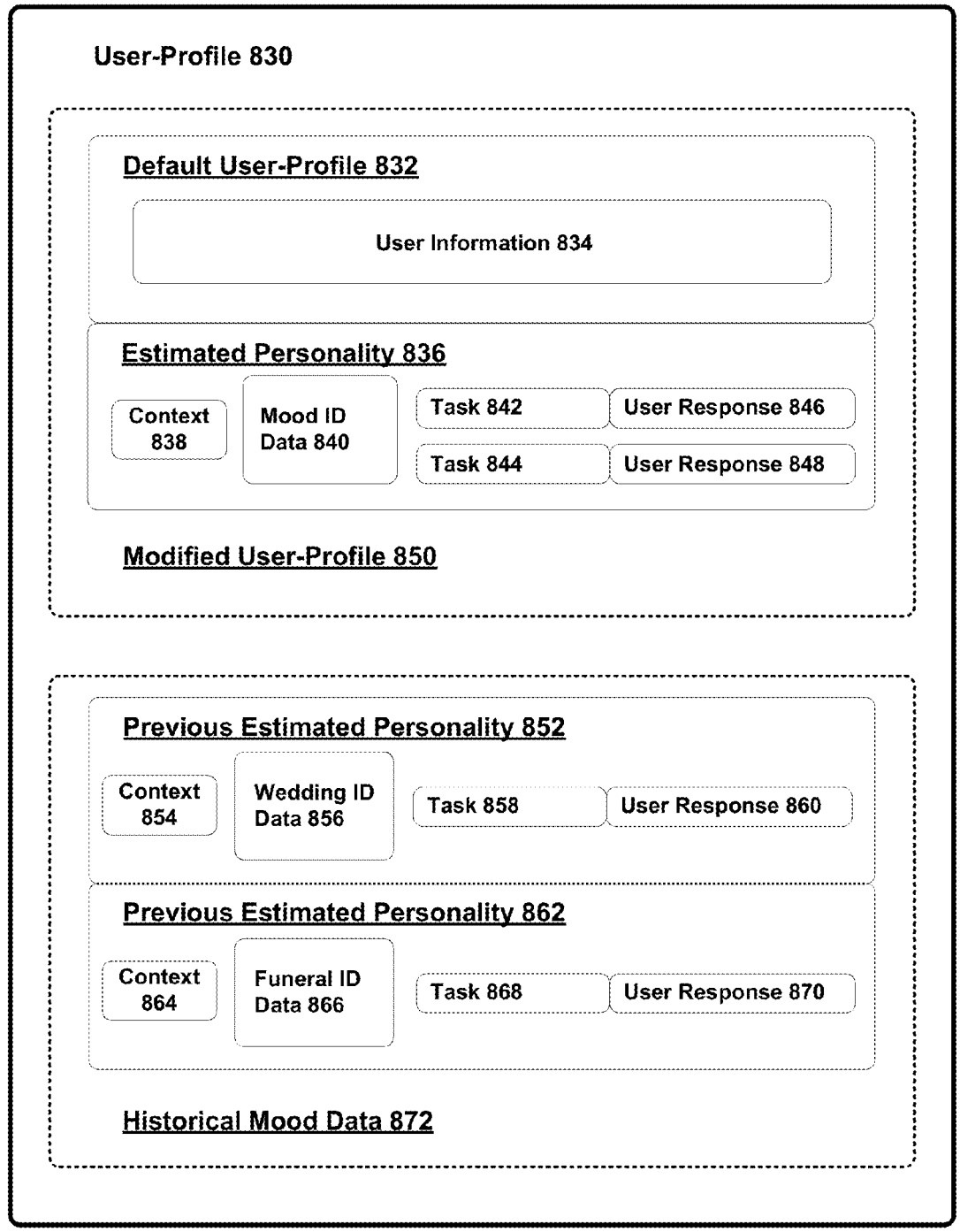
FIG. 8C is a block diagram illustrating a user-profile, in accordance with at least some embodiments described herein.

FIG. 8C is a block diagram illustrating an example user-profile 830. In some examples, the user-profile may be created in a database written in Structured Query Language (SQL). Further, the database may include a schema that defines tables, fields, relationships, triggers, procedures, sequences, and other elements which may be used to establish a user-profile. Alternatively, the database may be created with a relational database management system that combines database engines with a graphical user interface and other software development tools.

In some examples, the user-profile 830 may be created specifically for a particular user. The user-profile 830 may include a default user-profile 832 which may have a similar structure as the default user-profile discussed for FIG. 8B. In some examples, the default user-profile 832 may include user information 834, which may correspond to the user's personality, lifestyle (possibly including the user's profession), preferences (such as to high-protein foods), and/or predispositions (perhaps reflecting that the user is allergic to peanuts). For instance, the user information 834 may be collected as multiple tables in a database. Each category such as the user's personality, lifestyle, and preferences may be maintained in a separate table with multiple fields describing each category further. In addition, multiple records may be kept and added to as more information regarding the user is obtained.

In some examples, the user information 834 may also include the user's schedule indicating when the user is working and when the user available to communicate with a device. The user's schedule may be used to anticipate when the user is likely to communicate with a device. In some instances, the user information 834 may include when the user typically communicates with devices certain devices such as personal computers, tablets, and/or other robots. Such information may not only be useful in anticipating the user's communication but also with predicting the particular device the user may communicate with. Furthermore, the user information 834 may include information identifying each device that a user has communicated with and how to obtain information from these devices through cloud networks while using specific interfaces, protocols, communication links, and/or other networks. For example, the user information 834 may include the IP address of the laptop when participating in a computer network such that the host or network interface may be identified and its location may be determined.

In some examples, a robot may estimate a personality for the user and incorporate an estimated persona 836 with the default user-profile 832 to provide a modified user-profile 850. Estimated personality 836 may include a context 838 and corresponding mood identification data 840. In some instance, the context 838 may include characters, diction, word-choice, and/or sentence structures of the user's correspondence with the user device. Furthermore, the estimated mood 836 may also include corresponding tasks performed (such as task 842 and 844) and associated user reinforcement responses (such as user response 846 and 848, respectively.)

In one example, a user with the user-profile 830 may be at the user's birthday party. The estimated mood 836 may correspond to the context 838 indicating this is the user's "birthday celebration." In particular, the context may be determined from multiple text messages and emails sent to the user's cell phone wishing the user a happy birthday. The context 838 may further correspond to mood identification data 840 estimating that the user is in a "happy" mood. The robot may perform the task 842 by adopting a jovial personality. In some cases, in response to the user's words, the robot may estimate a negative mood and update the personality identification data 840 to be "not so jovial." In other cases, the robot may keep the mood identification data 840 to be "happy" until further information can be provided. Although, the robot may cease performing further tasks, the robot may be programmed to perform a further task according to the modified user-profile 850. In some instances, the robot may respond to the negative reinforcement response by continuing to perform other tasks until a positive reinforcement response is receives. Therefore, the robot may perform the task 844 by bringing out the user's birthday cake and lighting candles on the cake. The user response 848 may again be a negative reinforcement response or "non-responsive" where the user ignores the birthday cake.

Therefore, the robot may be unable to determine a task to receive a positive user response based on the estimated personality 836.

In some instances, the user-profile 830 may also include historical personality data 872 such that the robot may analyze previous estimated circumstances 852 and 862. For example, previous estimated circumstances 852 and 862 may include a wedding or a funeral reflected identification data 856 and 866, respectively. Further, the robot may analyze context 854 which may indicate a general context for a "celebration" personality for the wedding identifier 856.

In some instances, the robot may compare current context 838 with the context 854 of a "celebration" event corresponding to previous estimated circumstance identification data 856. Upon this comparison, the robot may determine a substantially close or best match (e.g., having matched a clown in the contextual environment, the robot determines this is not a "wedding celebration" but a "birthday celebration").

Responsive to the match, the robot may perform prior task 868 corresponding to the previous identification data 866, which may include bringing the user a balloon. The user may give the robot a positive reinforcement response by smiling at the robot and thanking the robot. Therefore, the robot may add task 868 and the corresponding user response 870 to the positive estimated mood 836. Further, the robot may continue performing prior task 868 and provide more balloons to the user until a negative reinforcement response is given to the robot.

In some embodiments, multiple robots may modify the user-profile 830. For example, referring FIG. 4, where various robots may interact with the cloud 410 and share information with each other as shown in the example system 400. Robots 402, 404, 406, and 408 may perform tasks 842, 844, 858, and 868, respectively. Each task may be performed simultaneously or in some embodiments, they may be performed at different times. In either case, the user may give reinforcement responses 846, 848, 860, and 870 sequentially to each task and each response may be recorded to the user-profile accessible through cloud 410.

c. Learning and Adaptation to User Based on User Data

Figure 9:
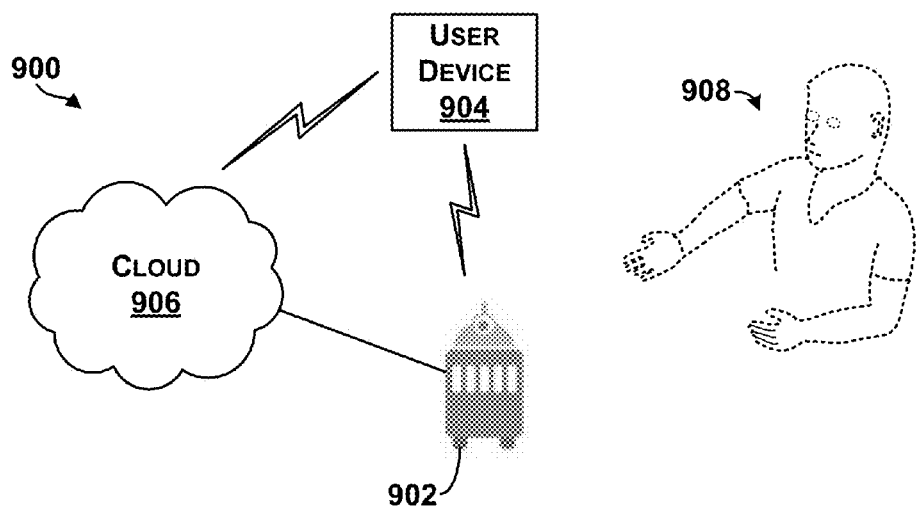
FIG. 9 illustrates an example system in which a robot may access a user device either directly (using wired or wireless connections) or through a cloud, and perform interactions with a user.

FIG. 9 illustrates an example system 900 in which a robot 902 may access a user device 904 either directly (using wired or wireless connections) or through a cloud 906, and perform interactions with a user 908. The system 900 is similar to the system 700 illustrated in FIG. 7, and thus, components and functions may be similar to those described above for system 700.

FIG. 9 also illustrates a user 908 with which the robot may interact. For example, the robot 902 may receive data associated with the user 908 to identify the user 908. The robot 902 may have a number of sensors (e.g., microphones, cameras) and may use any of speech recognition or face recognition to identify the user 908. In instances in which the specific user may not be identified or known by the robot 902, the robot 902 may further attempt to personalize the user based on a gender, an age estimate, and/or other factors.

The robot 902 may further use other local sensors to make a determination regarding an attitude or mood of the user 908. For example, the robot 902 may analyze characteristics of the user 908 including facial features, a tone of voice, a heart rate, blood pressure, to make a determination regarding an attitude or mood of the user 908.

In addition, in some examples, the robot 902 may provide a personalized interaction or response to the user 908 based on the determined information of the user 908. For example, the robot 902 may interact differently with an elderly woman versus a young man, or may interact differently with a happy person versus an angry person. For example, the robot may raise its communication volume when interacting with an elderly person because past interactions with elderly person suggest that an elderly person may become frustrated or confused (based on the sensor data) when the elderly person cannot hear or understand spoken words from the robot.

In some examples, the robot 902 may obtain information from user device 904 and utilize a user-profile to determine a personality for the user 908. For example, similar to scenario above where the user may act differently when interacting with an elderly woman, the user-profile for user 908 may include adopting an elderly man persona to communicate with the user via the user device 904.

Figure 10:
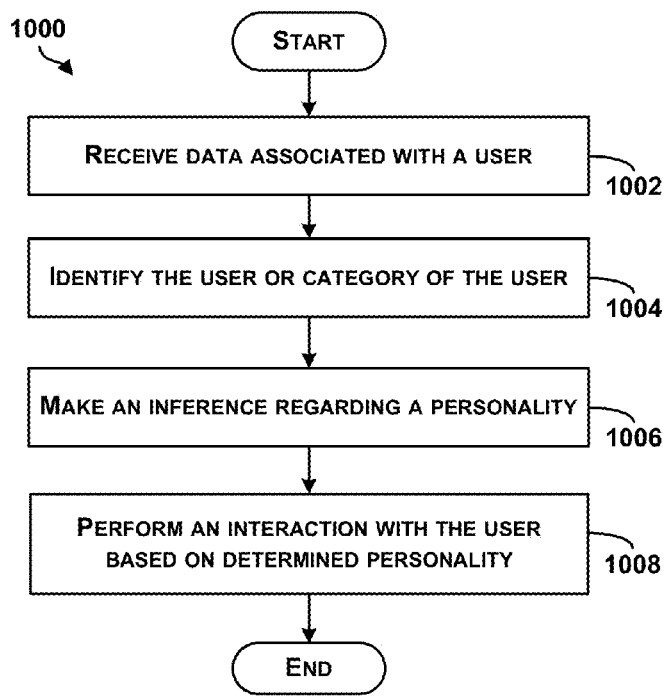
FIG. 10 is a block diagram of an example method of a robot accessing a user device to facilitate interactions with the user, in accordance with at least some embodiments described herein.

FIG. 10 is a block diagram of an example method of a robot accessing a user device to facilitate interactions with the user, in accordance with at least some embodiments described herein. Method 1000 shown in FIG. 10 presents an embodiment of a method that, for example, could be used with the systems 100 and 400, for example, and may be performed by a device, such as another devices illustrated in FIGS. 1-4, or components of the device. In addition, each block in FIG. 10 may represent a module, a segment, or a portion of program code, which includes one or more instructions executable by a processor for implementing specific logical functions or steps in the process. The program code may be stored on any type of non-transitory computer readable medium, for example, such as a storage device including a disk or hard drive.

At block 1002, the method 1000 includes receiving data associated with the user. For example, a robot may access a device of the user. The robot may have a number of sensors such as a microphone or camera to receive speech, video, pictures, of the user. The robot may further include an interface (e.g., keypad, keyboard, touchscreen) with which the user may interact, and the robot may receive data of the user via the interface.

At block 1004, the method 1000 includes identify the user or category of user. For example, the robot may use speech recognition or face recognition to identify the user. In instances in which the specific user may not be identified or known by the robot, the robot estimate a gender, an age, of the user to identify or determine a category of the user. The robot may have access to a database indicating categories of users and corresponding characteristics of the users. For example, one category may include a young man, and characteristics of users in this category may include a male in the age between 10-18.

At block 1006, the method 1000 optionally includes make a determination regarding an attitude or mood of the user. For example, the robot may further use other local sensors to analyze characteristics of the user including facial features, a tone of voice, a heart rate, blood pressure, to make a determination regarding a personality.

At block 1008, the method 1000 includes provide a personalized interaction or response to the user based on the determined information of the user. The robot may be configured to interact in a certain manner with certain individuals or categories of users. The robot may have access to a database that includes predetermined sets of interactions to perform based on who the user is identified to be or what category the user is determined to be within, for example.

Actions or functions of the method 800 may be performed by the robot, the cloud (or components of the cloud) in a distributed manner. Alternatively, all actions or functions of the method 800 may be performed locally by the robot.

d. Learning and Adaptation to User Based on User Interactions

In some examples, a robot may receive inputs from a user through touch and associate the inputs with a personality, and/or also with an appropriate response by the robot. For example, if a user pats the robot on the head, the robot may determine that the user is pleased, and may respond appropriately (e.g., by adopting the personality of a favorite dog or cat). In this manner, the robot may attempt to respond to human interactions. The robot may have access to a database that includes interactions to perform based on received physical inputs from the user.

Input received from sensors on the robot may be classified as positive, neutral, negative, and based on the classification, the robot may be configured to provide an appropriate response. The robot may interact with the cloud to determine an appropriate classification, an appropriate response.

In some examples, the robot may perform emotional learning that can be associated with episodes (e.g., situations, times), and the episodes can be stored and recalled as appropriate. For example, if the user consistently provides a positive physical interaction with the robot when the robot performs a certain function, the robot may be configured to determine that the certain function is acceptable by the user. As an alternative, if the user consistently provides a negative physical interaction with the robot when the robot performs another certain function, the robot may be configured to determine that this certain function is not acceptable by the user. Emotional learning can be customized to individual users so that the robot can learn different responses appropriate to different users. Alternately, when no history for a user exists, a robot can use histories of other similar users to interpolate an appropriate response for the user.

A robot may be configured to perform as a counselor or social agent by determining an appropriate response to the user. The robot can build emotion models or access emotion models on the cloud to determine an appropriate reaction to a situation (e.g., a child-tending robot may be configured to performed behaviors specifically tuned to a specific child).

e. Interpretation of User Based on Multiple Inputs

In some examples, the robot may determine an appropriate interaction for a given user based on any combination of the types of data described above, including user data (e.g., facial expression), user interaction (e.g., physical touch to robot), and/or user information (e.g., data received from a user device).

In some examples, the robot may synthesize inputs received from multiple sensors to infer a personality. For example, the robot could use sensors to analyze (i) a person's facial expressions; (ii) tone of voice; (iii) word usage; (iv) body temperature, pulse rate, blood pressure, and so on. The robot may interpret these inputs to determine the reaction/attitude/mood of the person in response to the robot's actions so that data collected by sensors on the robot can be abstracted into data indicating a personality.

In examples described herein, any of the methods may facilitate functions for a higher-level service (e.g., higher in a software stack), such that details and specifics for how to perform the specific function may be performed by the cloud. The robot may be configured to perform actions/functions based on a result of the specific function, rather than or in addition to, performing the specific function. The cloud may perform functions associated with a behavior/emotion recognition system that is at a higher level in the software stack than software on the robot that is configured to cause the robot to receive sensor data, for example, and the system on the cloud may abstract out various sensor inputs into higher level methods and/or attributes. As an example, using the method 800, the robot may execute software to perform function calls, which may cause the robot to provide data from sensors to the cloud and receive from the cloud information indicating a personality. In this manner, the robot may be caused to perform certain functions (e.g., gather data from sensors) by the cloud, and to perform other functions (e.g., perform actions based on the determined mood) based on locally executed software.

Thus, the robot may be configured to execute functions higher in a software stack based on instructions received from the cloud, for example. A robot applications can be developed without having to query a camera to determine a user action, or to query a microphone to detect choice speech, but rather, robot applications can be developed to include functions calls, such as Determine.userHappy( ), which may return True, for example. Underlying processing of data may be performed by the cloud based on data received from the robots.

f. Transfer of Robot Behavior Across Cloud-Coupled Devices

In another example, as described above with reference to FIG. 4, robots may interact and share information through the cloud. A given robot may determine and store preferences about a given user as to personalities. A robot may respond to different users in different ways. The robot may be configured to perform actions associated with a given personality that may be learned over time based on interactions with a user that may be designed by a personality author, or may be a combination of learned and designed responses, for example.

A robot's personality or personalization can be transferred from one robot to another robot, or information stored on one robot can be shared with another robot over the cloud. This may enable one robot encountering a user to learn from experiences accumulated from other robots interacting with similar users, as well as many other forms of generalization and personalization.

Figure 11:
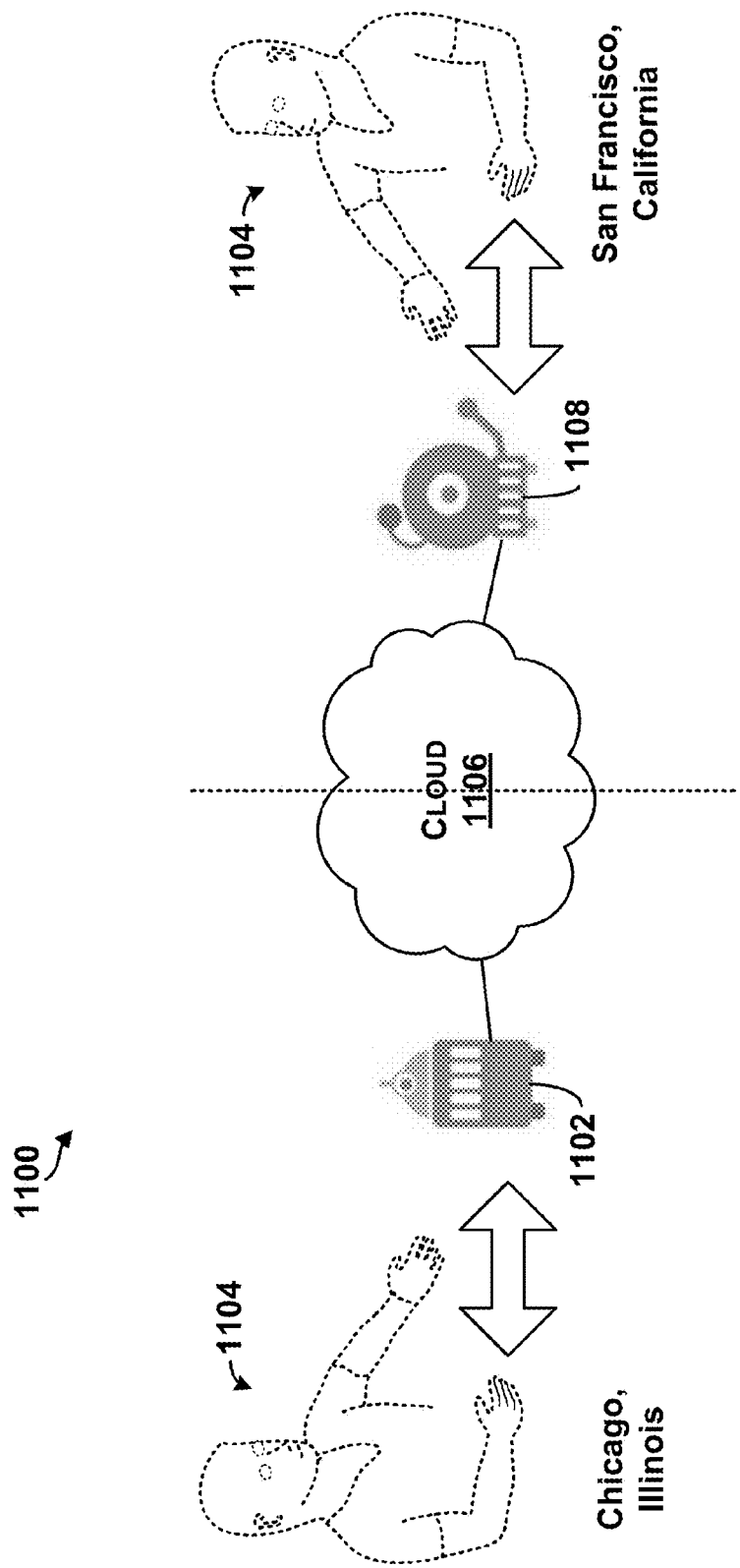
FIG. 11 is an example system in which robots may interact with the cloud and share information with other cloud computing devices, all arranged in accordance with at least some embodiments described herein.

FIG. 11 is an example system 1100 in which robots may interact with the cloud and share information with other cloud computing devices. In the system 1100, a first robot 1102 may interact with a user 1102, and may develop a personality based on learned interactions with the user 1104. The first robot 1102 may share the personality over a cloud 1106 with a second robot 1108. In this example, the user 1104 may reside in Chicago, Ill., and may travel to San Francisco, Calif. While in San Francisco, the user 1104 may interact with the second robot 1108 and may desire that the second robot 1108 act or respond to the user 1104 in the same or similar manner as the first robot 1102. Thus, the second robot 1108 may receive the personality of the first robot 1102 over the cloud 1106 so as to mimic actions performed by the first robot 1102, for example.

In some examples, robots operating in a given city or country may be configured to operate according to local customs or cultures. The robots may receive shared personalities of another robot, but may modify the shared personality to be in line with local customs or cultures, for example.

In still other examples, a robot may learn a personality of a specific person or other groups of people as well. For example, the robot may learn "manners" or "customs" of different groups, or perhaps the manners or customs of people in different social situations, and may develop a personality appropriate for interacting with such people. The robot may then share the personality with other robots over the cloud.

5. CONCLUSION

It should be understood that arrangements described herein are for purposes of example only. As such, those skilled in the art will appreciate that other arrangements and other elements (e.g., machines, interfaces, functions, orders, and groupings of functions) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

We claim:

1. A method for providing a robot apparatus with a personality, the method comprising:
    obtaining, by a first device associated with a robotic apparatus, information from a second device, wherein the information relates to communication between a user and the second device containing personification indicators, and wherein the first device is configured to interact with the user;
    in response to obtaining the information, the first device processing that information to obtain data usable to modify the robotic apparatus so as to provide the robotic apparatus with a personality, wherein processing comprises accessing a cloud computing system and analyzing one or more data of the information selected from the group of (i) characters, (ii) word-choice, and (iii) sentence structure relating to the communication between the user and the second device; and
    based on the data, the first device modifying the robotic apparatus so as to provide the robotic apparatus with a personality.

2. The method of claim 1, wherein the first device includes a default personality for the robotic apparatus.

3. The method of claim 2, wherein the robotic apparatus includes a computing ability and is configured to interact with an ambient environment using an actuation capability.

4. The method of claim 1, wherein the second device includes one or more of a personal computer, a mobile telephone, a tablet computer, and a landline telephone.

5. The method of claim 1, wherein the second device includes one or more of a personal computer, a mobile telephone, a tablet computer, and a landline telephone.

6. The method of claim 5, wherein the personality is based upon identifying a context of the local weather environment.

7. The method of claim 1, wherein the personality is based on identifying a context of a time of day, and stored historical information associated with the user and time of day.

8. The method of claim 1, wherein the personality is based on identifying a context of a location of the user.

9. The method of claim 1, wherein the personality comprises:
    identifying indicators of a desired personality from the context of the communication between the user and the second device.

10. The method of claim 1, wherein the personality comprises an assessment of visual indicators detected in the vicinity of the robotic apparatus;
    accessing the cloud computing system to determine a best-fit of matches with some or all of the visual indicators;
    modifying the personality of the robotic apparatus in view of a personality determined from the best-fit of the matches.

11. The method of claim 1, wherein the personality comprises analyzing historical mood data, and wherein the historical mood data comprises:
    a context of an event associated with a previous mood of the user;
    a previous task performed by the first device associated with the previous mood of the user; and
    a reinforcement response received by the first device from performing the previous task.

12. The method of claim 11, further comprising:
    comparing a current context with the context of the event associated with the previous mood of the user; and
    responsive to the current context substantially matching the context of the event corresponding to the previous mood of the user, estimating the mood of the user based on the previous mood.

13. The method of claim 11, further comprising:
    comparing a current mood of the user with the previous mood of the user; and
    responsive to the current mood of the user substantially matching the previous mood of the user, adopting a personality corresponding to the previous mood.

14. The method of claim 1, wherein the personality comprises the first device obtaining secondary information from one or more other devices, and wherein the secondary information relates to secondary communication between the user and the one or more other devices.

15. A robotic apparatus comprising;
    a robot presence;
    a processor;
    sensors that detect data in the vicinity of the robot presence; and
    memory including instructions stored thereon executable by the processor that when executed by the processor cause the robotic apparatus to perform the following functions:
        obtaining information from sensory input to the robot presence;
        in response to obtaining the information, estimating a personality, wherein the personality comprises an assessment of a visual indicator detected in the vicinity of the robotic apparatus;
        accessing a cloud computing system to determine one or more matches with the visual indicator;
        modifying the personality in view of a personality determined from the one or more matches; and
        based on the modified personality, adopting that personality for the robot presence.

16. The robotic apparatus of claim 15, wherein:
    obtaining information comprises one or more of characters, word-choice, and sentence structure of the information relating to a communication between a user and a second device; and
    responsive to the information, estimating the personality.

17. A non-transitory computer-readable medium having stored therein instructions that when executed by a computing apparatus, cause the computing apparatus to perform a method for providing a robot apparatus with personification attributes, the method comprising:
    obtaining information, as from a device, wherein the information relates to communication between a user and the device, and wherein the computing apparatus is configured to interact with the user;

accessing a cloud computing system and analyzing, within the information, one or more data selected from the group of (i) characters, (ii) word-choice, and (iii) sentence structure to obtain data usable to modify the computing apparatus so as to provide the computing apparatus with a personality; and in response, estimating a personality for the computing apparatus; and based on the estimated personality, modifying the computing apparatus to incorporate the estimated personality.

18. The non-transitory computer-readable medium of claim 17, wherein the computing apparatus obtains information for determining a context corresponding to an event; and
responsive to determining the context, modifying the personality.

* * * * *